(12) United States Patent
Kyung

(10) Patent No.: US 12,525,281 B2
(45) Date of Patent: Jan. 13, 2026

(54) DYNAMIC RANDOM-ACCESS MEMORY (DRAM) DEVICE, MEMORY BANK OF DRAM DEVICE AND METHOD THEREOF

(71) Applicant: Winbond Electronics Corp., Taichung (TW)

(72) Inventor: Ki-Myung Kyung, Zhubei (TW)

(73) Assignee: Winbond Electronics Corp., Taichung (TW)

( * ) Notice: Subject to any disclaimer, the term of this patent is extended or adjusted under 35 U.S.C. 154(b) by 198 days.

(21) Appl. No.: 18/508,136

(22) Filed: Nov. 13, 2023

(65) Prior Publication Data

US 2025/0157525 A1 May 15, 2025

(51) Int. Cl.
| | | |
|---|---|---|
| *G11C 7/00* | (2006.01) | |
| *G11C 11/4076* | (2006.01) | |
| *G11C 11/408* | (2006.01) | |
| *G11C 11/4091* | (2006.01) | |
| *G11C 11/4097* | (2006.01) | |

(52) U.S. Cl.
CPC ...... *G11C 11/4091* (2013.01); *G11C 11/4076* (2013.01); *G11C 11/4085* (2013.01); *G11C 11/4097* (2013.01)

(58) Field of Classification Search
CPC ............ G11C 11/4091; G11C 11/4076; G11C 11/4085; G11C 11/4097
See application file for complete search history.

(56) References Cited

U.S. PATENT DOCUMENTS

| | | | |
|---|---|---|---|
| 6,278,647 B1* | 8/2001 | Saitoh | G11C 7/1006 365/230.03 |
| 6,424,554 B1 | 7/2002 | Kawasumi | |
| 8,054,705 B2 | 11/2011 | Shimogawa et al. | |
| 9,368,191 B2* | 6/2016 | O'Connell | G11C 11/4091 |
| 10,553,273 B2 | 2/2020 | Ryu et al. | |
| 11,164,621 B2 | 11/2021 | Yamazaki et al. | |
| 11,238,908 B2 | 2/2022 | Tsai et al. | |

* cited by examiner

*Primary Examiner* — Min Huang
(74) *Attorney, Agent, or Firm* — JCIPRNET

(57) ABSTRACT

A dynamic random-access memory (DRAM) device includes a first physical memory area corresponding to a first memory mat, a second physical memory area corresponding to a second memory mat, bit line pairs, switch pairs and sense amplifiers. The first and second physical memory areas include memory cells of the first memory bank and memory cells of the second memory bank being arranged alternately. The sense amplifiers of the first memory bank are electrically connected to first-bank bit line pairs in the first and second physical memory areas during a first row cycle time period. The sense amplifiers are configured to perform a memory operation to the memory cells connected to the first-bank bit line pairs during the first row cycle time period.

20 Claims, 8 Drawing Sheets

DYNAMIC RANDOM-ACCESS MEMORY (DRAM) DEVICE, MEMORY BANK OF DRAM DEVICE AND METHOD THEREOF

BACKGROUND

Technical Field

The disclosure relates to a memory device, and more particularly relates to a dynamic random-access memory (DRAM) device with a small occupied area.

Description of Related Art

A memory device such as a dynamic random-access memory (DRAM) device is widely used in many electronic devices for storing data. The DRAM device may be manufactured using wafer die, and an increase in a number of the DRAM device per wafer die is desired for saving manufacturing cost of the DRAM device. A conventional DRAM device includes a plurality of sense amplifiers, in which each sense amplifier is coupled to a pair of bit lines of the DRAM device. However, the sense amplifiers occupy a large area of the DRAM device on the wafer die. Thus, an architecture of the DRAM device with a reduced area of the sense amplifiers is desired to reduce occupied area of the DRAM device and to improve the wafer die competitiveness.

SUMMARY

In some embodiments of the disclosure, a dynamic random-access memory (DRAM) device includes a first physical memory area corresponding to a first memory mat, a second physical memory area corresponding to a second memory mat. Each of the first physical memory area and the second physical memory area includes a plurality of memory cells, wherein the memory cells include memory cells of the first memory bank and memory cells of the second memory bank. The memory cells of the first memory bank and the memory cells of the second memory bank are arranged alternately in each of the first physical memory area and the second physical memory area. The bit line pairs include first-bank bit line pairs and second-bank bit line pairs, the first-bank bit line pairs are connected to the memory cells of the first memory bank in the physical memory area, and the second-bank bit line pairs are connected to the memory cells of the second memory bank in the physical memory area. The sense amplifiers are connected to the bit line pairs via the switch pairs, each sense amplifier being connected to at least two bit line pairs via at least two switch pairs. The switch pairs are configured to electrically connect the sense amplifiers to the first-bank bit line pairs in the first physical memory area and the second physical memory area during a first row cycle time period. The sense amplifiers are configured to perform a memory operation to the memory cells connected to the first-bank bit line pairs in the first physical memory area and the second physical memory area during the first row cycle time period.

In some embodiments, a dynamic random-access memory (DRAM) device includes a plurality of memory cells, a plurality of bit line pairs, a plurality of switch pairs and a plurality of sense amplifiers. The memory cells include first selected memory cells and second selected memory cells for a memory operation. The bit line pairs include first-bank bit line pairs and second-bank bit line pairs, wherein the first-bank bit line pairs are connected to the first selected memory cells, and the second-bank bit line pairs are connected to the second selected memory cells. The switch pairs include first-bank switch pairs and second-bank switch pairs, wherein the first-bank switch pairs are connected to the first-bank bit line pairs and the second-bank switch pairs are connected to the second-bank bit line pairs. The sense amplifiers are connected to the bit line pairs via the switch pairs, and each sense amplifier being connected to at least two bit line pairs via at least two switch pairs. The first-bank switch pairs are configured to electrically connect the sense amplifiers to the first-bank bit line pairs, and the sense amplifiers are configured to perform the memory operation on the first selected memory cells connected to the first-bank bit line pairs during a first row cycle time period. The second-bank switch pairs are configured to electrically connect the sense amplifiers to the second-bank bit line pairs, and the sense amplifiers are configured to perform the memory operation on the second-bank selected memory cells connected to the second-bank bit line pairs during a second row cycle time period.

In some embodiments, a method of a DRAM device comprising a first physical memory area corresponding to a first memory mat, and a second physical memory area corresponding to a second memory mat, a plurality of sense amplifiers, a plurality of bit line pairs and a plurality of switch pairs. The method includes steps of selecting a plurality of memory cells for a memory operation, wherein the memory cells comprise memory cells of the first memory bank and memory cells of the second memory bank, and the memory cells of the first memory bank and the memory cells of the second memory bank are arranged alternately in each of the first a physical memory area and the second physical memory area; controlling switch pairs of the first memory bank to electrically connect the sense amplifiers to the first-bank bit line pairs in the first physical memory area and the second physical memory area during a first row cycle time period; and performing a memory operation to the memory cells connected to the first-bank bit line pairs in the first physical memory area and the second physical memory area during the first row cycle time period.

In summary, each sense amplifier of the DRAM device is connected to at least two bit line pairs via at least two switch pairs. During a first row cycle time period of the DRAM device, the switch pairs are configured to electrically connect each sense amplifier with one bit line pair among the at least two bit line pair. During a second row cycle time period of the DRAM device, the switch pairs are configured to electrically connected each sense amplifier to another bit line pair among the at least two bit line pair. In this way, a number of sense amplifiers in the DRAM device is reduced, and the occupied area of the DRAM device is small. Furthermore, the sense amplifiers and the switch pairs of the DRAM device may operate in conjunction with a bank group concept. In the bank group concept, memory banks of the DRAM device are grouped into bank groups. In a in a same bank group, a same physical memory area may include memory cells of different banks being arranged alternately, and the rows of the memory cells in the physical memory area are connected to shared word lines. When a memory operation on selected memory cells is performed using the bank group concept, the memory operation can be performed on all selected memory cells within one row cycle time period of the DRAM device. As such, the DRAM device may have a reduced occupied area without degradation to the processing time of the memory operation.

To make the above features and advantages provided in one or more of the embodiments of the disclosure more comprehensible, several embodiments accompanied with drawings are described in detail as follows.

DESCRIPTION OF THE EMBODIMENTS

Figure 1:
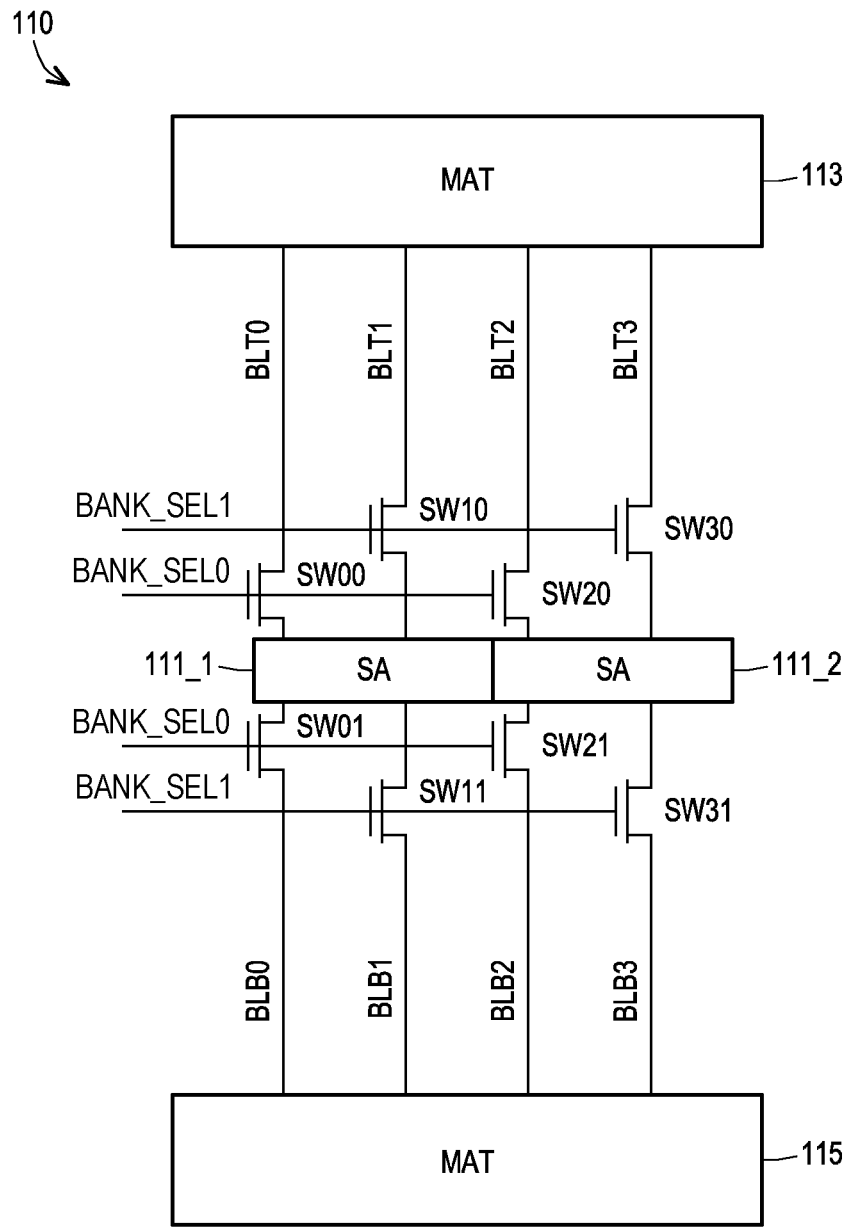
FIG. 1 is a schematic diagram of a DRAM device in accordance with some embodiments.

References are made in detail to the present preferred embodiments of the invention, examples of which are illustrated in the accompanying drawings. Wherever possible, the same reference numbers are used in the drawings and the description to refer to the same or like parts.

Referring to FIG. 1, a DRAM device 100 includes a memory bank 110, where the memory bank 110 may include a plurality of sense amplifiers 111_1 and 111_2, a plurality of bit line pairs (BLT0, BLB0) through (BLT3, BLB3), a plurality of switch pairs (SW00, SW01) through (SW30, SW31), and a plurality of memory mats 113 and 115. Each of the memory mats 113 and 115 of the memory bank 110 may include a plurality of memory cells arranged in rows and columns. The memory cells of the memory mat 113 are electrically connected to bit lines BLT0 to BLT3, and the memory cells of the memory mat 115 are electrically connected to bit line bars BLB0 to BLB3. Each of the memory mats 113 and 115 of the memory bank 110 may correspond to a physical memory area (not shown). Each bit line pair is formed by one bit line among the bit lines BLT0 to BLT3 and one bit line bar among the bit line bars BLT0 to BLT3. For example, a bit line pair (BLT0, BLB0) includes the bit line BLT0 and the bit line bar BLB0, a bit line pair (BLT1, BLB1) includes the bit line BLT1 and the bit line bar BLB1, a bit line pair (BLT2, BLB2) includes the bit line BLT2 and the bit line bar BLB2, and a bit line pair (BLT3, BLB3) includes the bit line BLT3 and the bit line bar BLB3.

Each of the switch pairs (SW00, SW01) through (SW30, SW31) is controlled by one of bank selecting signals BANK_SEL0 and BANK_SEL1. For example, the switch pairs (SW00, SW01), (SW20, SW21) are controlled by the bank selecting signal BANK_SEL0, and the switch pairs (SW10, SW11), (SW30, SW31) are controlled by the bank selecting signal BANK_SEL1. In some embodiments, each switch pair corresponds to one of the bit line pairs. For example, the switch pair (SW00, SW01) corresponds to bit line pair (BLT0, BLB0), and the switch pair (SW30, SW31) corresponds to bit line pair (BLT3, BLB3).

Each of the sense amplifiers 111_1 and 111_2 is connected to at least two bit line pairs via at least two switch pairs corresponding to the at least two bit line pairs. For example, the sense amplifier 111_1 is connected to the bit line pair (BLT0, BLB0) and (BLT1, BLB1) via the switch pair (SW00, SW01) and (SW10, SW11); and the sense amplifier 111_2 is connected to the bit line pair (BLT2, BLB2) and (BLT3, BLB3) via the switch pair (SW20, SW21) and (SW30, SW31).

The switch pairs are configured to control electrical connections between the sense amplifiers 111_1 and 111_2 and the bit line pairs based on the bank selecting signals BANK_SEL0 and BANK_SEL1. When the selecting signal BANK_SEL0 is asserted to the memory bank 110, the sense amplifiers 111_1 and 111_2 are electrically connected to the bit line pair (BLT0, BLB0) and (BLT2, BLB2). Accordingly, the sense amplifiers 111_1 and 111_2 may perform a memory operation (i.e., an ACTIVE-RD/WT-PRE-CHARGE operation) on the memory cells connected to the bit line pair (BLT0, BLB0) and (BLT2, BLB2). The ACTIVE-RD/WT-PRECHARGE operation may include a row active operation, a read or write operation and a pre-charge operation which may be performed within one single row cycle time period (tRC) of the DRAM device. When the bank selecting signal BANK_SEL1 is asserted to the memory bank 110, the sense amplifiers 111_1 and 111_2 are electrically connected to the bit line pair (BLT1, BLB1) and (BLT3, BLB3). Accordingly, the sense amplifiers 111_1 and 111_2 may perform the memory operation on the memory cells connected to the bit line pair (BLT1, BLB1) and (BLT3, BLB3). In some embodiments, a time interval when the bank selecting signal BANK_SEL0 is asserted to the memory bank 110 does not overlap with the time interval when the bank selecting signal BANK_SEL1 is asserted to the memory bank 110. For example, the bank selecting signal BANK_SEL0 is asserted to the DRAM device in a first row cycle time period, and the bank selecting signal BANK_SEL1 is asserted to the DRAM device in a second row cycle period that is after the first row cycle time period. Since the switch pairs may selectively select bit line pairs to be connected to the sense amplifiers, the number of required sense amplifiers in the DRAM device is reduced, and the occupied area of the DRAM device in the wafer die is reduced accordingly.

Figure 2:
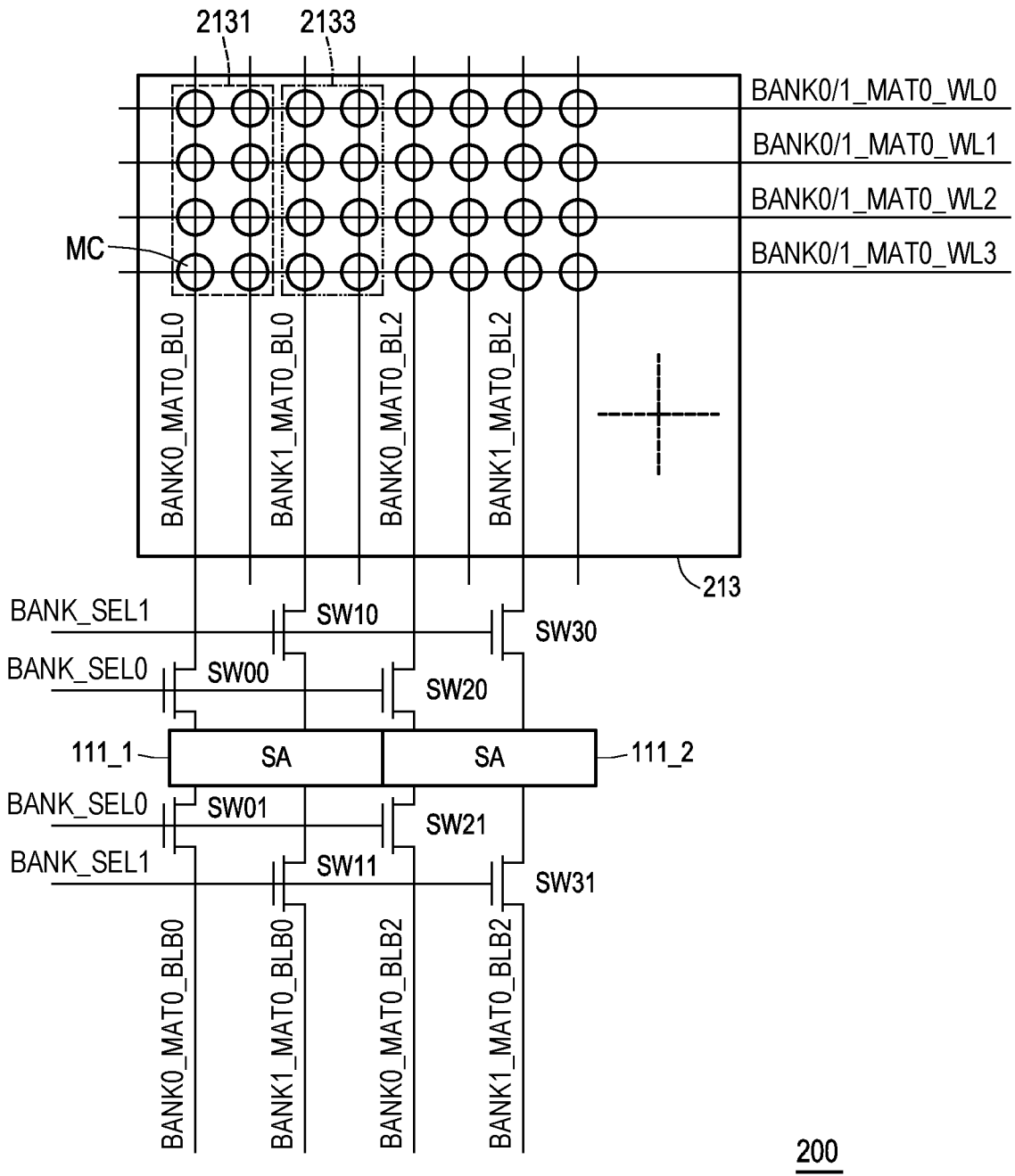
FIG. 2 is a schematic diagram of a DRAM device including a physical memory area corresponding to a memory mat in accordance with some embodiments.

FIG. 2 illustrates a DRAM device 200 that include a physical memory area 213 corresponding to a memory mat, a plurality of sense amplifiers 111_1, 111_2, a plurality of bit line pairs (BANK0_MAT0_BL0, BANK0_MAT0_BLB0) through (BANK1_MAT0_BL2, BANK1_MAT0_BLB2) and a plurality of switch pairs (SW00, SW01) through (SW30, SW31). The sense amplifiers 111_1, 111_2, the bit line pairs (BANK0_MAT0_BL0, BANK0_MAT0_BLB0) through (BANK1_MAT0_BL2, BANK1_MAT0_BLB2) and the switch pairs (SW00, SW01) through (SW30, SW31) in FIG. 2 may be similar to the sense amplifiers 111_1, 111_2, the bit line pairs (BLT0, BLB0) through (BLT3, BLB3) and the switch pairs (SW00, SW01) through (SW30, SW31) in FIG. 1.

The physical memory area 213 may include an arrange of memory cells MC. The memory cells MC in the physical memory area 213 may include memory cells of different memory banks. For example, the DRAM device 200 may include memory banks BANK1 and BANK2, and the memory cells MC in the physical memory area 213 include some memory cells the memory bank BANK0 and some memory cells of the memory bank BANK1. The memory cells of the memory bank BANK0 and the memory cells of the memory bank BANK1 may be arranged alternately in the physical memory area 213. For example, the memory cells MC in an area 2131 of the physical memory area 213 are memory cells of the memory bank BANK0, and the memory cells MC in an area 2133 of the physical memory area 213 are memory cells of the memory bank BANK1.

The memory cells MC in the physical memory area 213 may be arranged in rows and columns. The rows of the memory cells MC are electrically connected to a plurality of shared word lines BANK0/1_MAT0_WL0 through BANK0/1_MAT0_WL3, which are shared between memory mats (i.e., a first memory mat and a second memory mat) of a memory bank of the DRAM 200. Each of the shared word lines BANK0/1_MAT0_WL0 to BANK0/1_MAT0_WL3 may be electrically connected to a row of the first memory mat and a row of the second memory mat. In some embodiments, the columns of the memory cells MC in the physical memory are 213 are electrically connected to bit lines of the memory bank BANK0 and bit lines of the memory bank BANK1. The bit lines of the memory bank BANK0 and bit lines of the memory bank BANK1 are alternately arranged in the physical memory area 213. As shown in FIG. 2, the bit lines BANK0_MAT0_BL0 and BANK0_MAT0_BL2 are bit lines of the memory bank BANK0, and the bit lines BANK0_MAT0_BL0 and BANK0_MAT0_BL2 may be referred to as first-bank bit lines. The bit lines BANK1_MAT0_BL0 and BANK1_MAT0_BL2 are bit lines of the memory bank BANK1, and the bit lines BANK1_MAT0_BL0 and BANK1_MAT0_BL2 may be referred to as second-bank bit lines. Similarly, the bit line bars BANK0_MAT0_BLB0 and BANK0_MAT0_BLB2 are bit line bars of the memory bank BANK0 and are also referred to as first-bank bit line bars, and the bit line bars BANK1_MAT0_BLB0 and BANK1_MAT0_BLB2 are bit line bars of the memory bank BANK1 and are also referred to as second-bank bit line bars. The switch pairs that are coupled to the first-bank bit lines are also referred to as first-bank switch pairs; and the switch pairs that are coupled to the second-bank bit lines are also referred to as second-bank switch pairs.

In some embodiments, the DRAM device 200 does not perform a memory operation on all selected memory cells simultaneously. Instead, the DRAM device 200 may perform the memory operation on parts of selected memory cells in a first row cycle time period (tRC) and then perform the memory operation on other parts of selected memory cells in a second row cycle time period ((RC). For example, in the first row cycle time period, the bank selecting signal BANK_SEL0 may be asserted to the DRAM device 200 to electrically connect the sense amplifiers 111_1 and 111_2 to the bit line pairs (BANK0_MAT0_BL0, BANK0_MAT0_BLB0) and (BANK0_MAT0_BL2, BANK0_MAT0_BLB2). The sense amplifier amplifiers 111_1 and 111_2 may perform the memory operation on the selected memory cells connected to the bit line pairs (BANK0_MAT0_BL0, BANK0_MAT0_BLB0) and (BANK0_MAT0_BL2, BANK0_MAT0_BLB2) in the first row cycle time period. Next, the bank selecting signal BANK_SEL1 may be asserted to the DRAM device 200 to electrically connect the sense amplifiers 111_1 and 111_2 to the bit line pairs (BANK1_MAT0_BL0, BANK1_MAT0_BLB0) and (BANK1_MAT0_BL2, BANK1_MAT0_BLB2) in the second row cycle time period. The sense amplifier amplifiers 111_1 and 111_2 may perform the memory operation on the selected memory cells connected to the bit line pairs (BANK1_MAT0_BL0, BANK1_MAT0_BLB0) and (BANK1_MAT0_BL2, BANK1_MAT0_BLB2) in the second row cycle time period. In this way, the DRAM device 200 may take more than one row cycle time period (tRC) to perform the memory operation on all selected memory cells for the memory operation. Furthermore, the architecture of the DRAM device 200 results in a reduction the number of sense amplifiers in the DRAM device 200.

Figure 3:
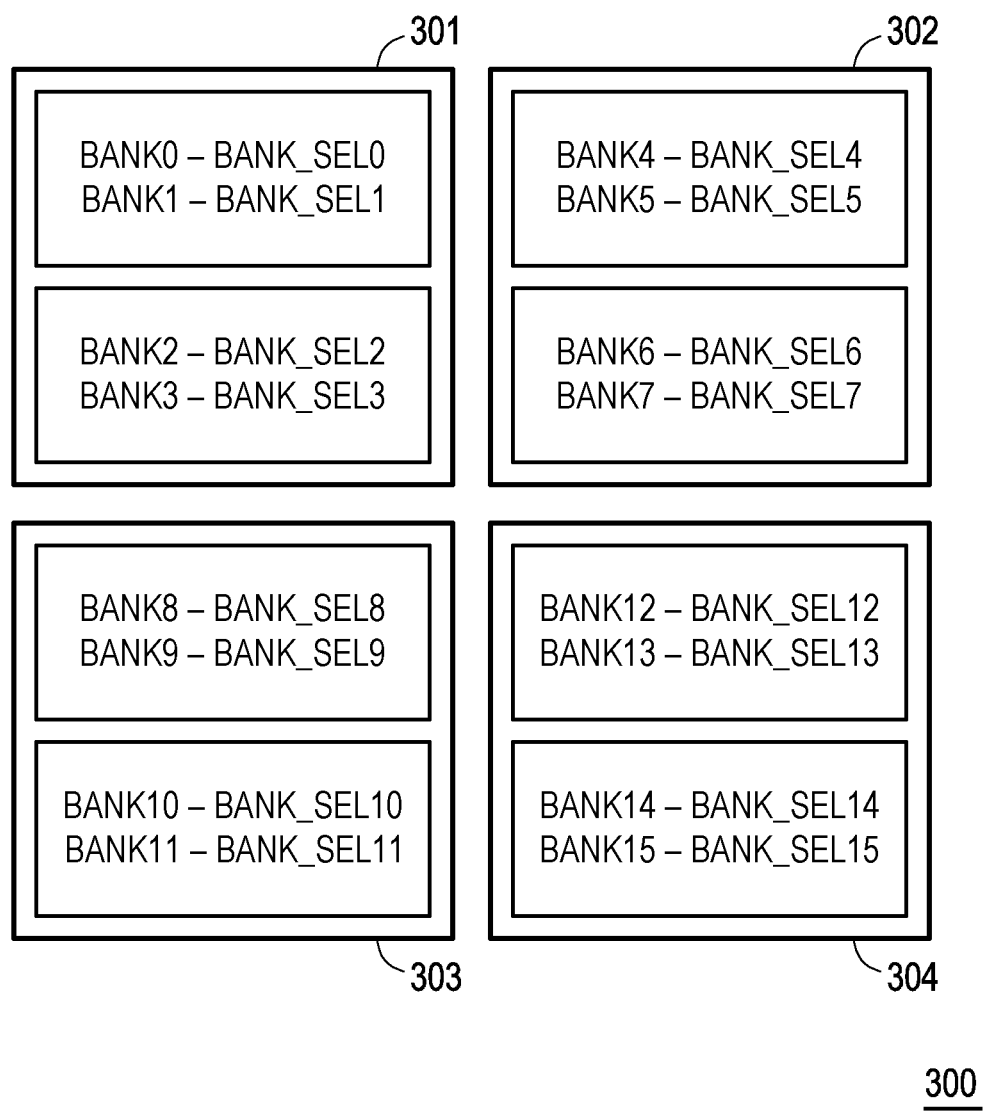
FIG. 3 is a schematic diagram of a bank group concept of a DRAM device in accordance with some embodiments.

FIG. 3 illustrates a schematic diagram of a bank group concept in a DRAM device 300 in accordance with some embodiments. The DRAM device 300 may include a plurality of memory banks BANK0 through BANK15 which are grouped into different bank groups 301, 302, 303 and 304. The memory banks BANK0 through BANK15 in the bank groups 301, 302, 303 and 304 are controlled by bank selecting signals BANK_SEL0 through BANK_SEL15. The bank group 301 includes memory banks BANK0 through BANK3 which are controlled by bank selecting signals BANK_SEL0 through BANK_SEL3. The bank group 302 includes memory banks BANK4 through BANK7 which are controlled by bank selecting signals BANK_SEL4 through BANK_SEL7. The bank group 303 includes memory banks BANK8 through BANK11 which are controlled by bank selecting signals BANK_SEL8 through BANK_SEL11. The bank group 304 includes memory banks BANK12 through BANK15 which are controlled by bank selecting signals BANK_SEL12 through BANK_SEL15. It notes that a number of the memory banks and a number of the bank groups in the DRAM device 300 are not limited in the present disclosure.

Figure 4A:
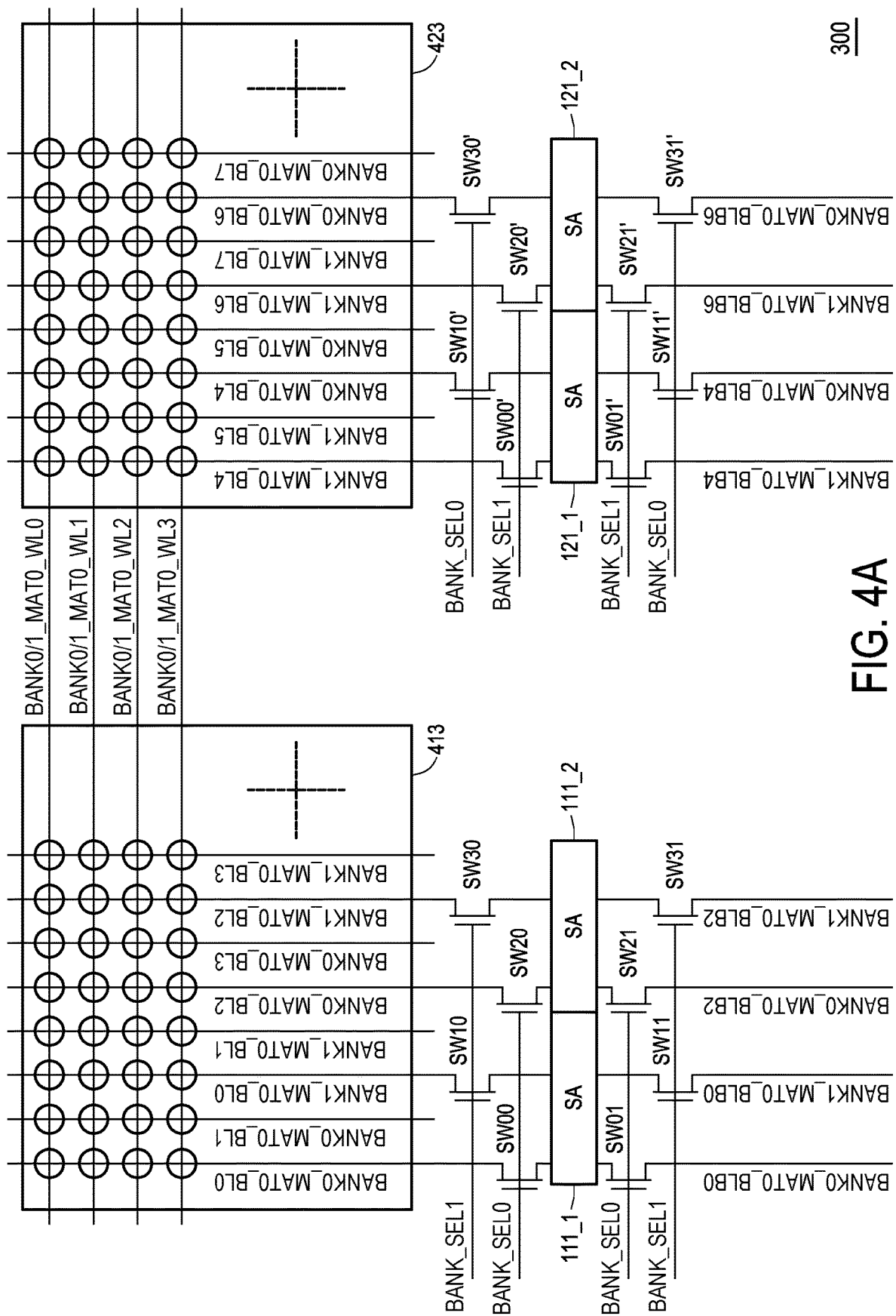
FIG. 4A to 4C are schematic diagrams of a DRAM device with a bank group concept in accordance with some embodiments.

FIG. 4A is a schematic diagram of the DRAM device 300 including physical memory areas 413 and 423 corresponding to first and second memory mats of a memory bank in accordance with some embodiments. The DRAM device 300 may further include a plurality of sense amplifiers and a plurality of switch pairs corresponding to the physical memory areas 413 and 423. In FIG. 4A, the sense amplifiers 111_1 and 112_2 and the switch pairs (SW00, SW01), (SW10, SW11), (SW20, SW21) and (SW30, SW31) correspond to the physical memory area 413; and the sense amplifiers 121_1 and 122_2 and the switch pairs (SW00', SW01'), (SW10', SW11'), (SW20', SW21') and (SW30', SW31') correspond to the physical memory area 423. The switch pairs (SW00, SW01), (SW10, SW11), (SW20, SW21) and (SW30, SW31) and the switch pairs (SW00', SW01'), (SW10', SW11'), (SW20', SW21') and (SW30', SW31') are controlled by bank selecting signals BANK_SEL0 and BANK_SEL1.

Each of the physical memory areas 413 and 423 may include a plurality of memory cells of different memory banks. For example, the memory cells in each of the physical memory areas 413 and 423 may include some memory cells of the memory bank BANK0 and some memory cells of the memory bank BANK1. The memory cells of the memory bank BANK0 and the memory cells of the memory bank BANK1 may be arranged alternately in each of the physical memory areas 413 and 423. The arrangement of the memory cells in each of the physical memory areas 413 and 423 in FIG. 4A is similar to the arrangement of the memory cells in the physical memory area 213 in FIG. 2, thus the detailed description of the arrangement of the memory cells are omitted hereafter.

The rows of the physical memory area 413 and the rows of the physical memory area 423 are connected to the shared word lines BANK0/1_MAT0_WL0 through BANK0/1_MAT0_WL3. In other words, each of the shared word lines BANK0/1_MAT0_WL0 through BANK0/1_MAT0_WL3 is connected to one row of the physical memory area 413 and one row of the physical memory area 423. In this way, when a word line selection signal is asserted to a specific shared word line to select memory cells for a memory operation, one row of the physical memory area 413 and one row of the physical memory area 423 are selected simultaneously for the memory operation.

The columns of each of the physical memory areas 413 and 423 are connected to bit lines of BANK0 and BANK1. For example, the columns of physical memory area 413 are connected to bit lines of BANK0 (i.e., bit lines BANK0_MAT0_BL0 through BANK0_MAT0_BL3) and bit lines of BANK1 (BANK1_MAT0_BL0 through BANK1_MAT0_BL3). The columns of the physical memory area 423 are connected to bit lines of BANK0 (i.e., bit lines BANK0_MAT0_BL4 through BANK0_MAT0_BL7) and bit lines of BANK1 (BANK1_MAT0_BL4 through BANK1_MAT0_BL7). The bit lines of the BANK0 and bit lines of the BANK1 are alternately arranged in each of the physical memory areas 413 and 423.

The sense amplifier 111_1 is connected to the bit line pair (BANK0_MAT0_BL0, BANK0_MAT0_BLB0) and (BANK1_MAT0_BL0, BANK1_MAT0_BLB0) via the switch pair (SW00, SW01) and (SW10, SW11); and the sense amplifier 111_2 is connected to the bit line pair (BANK0_MAT0_BL2, BANK0_MAT0_BLB2) and (BANK1_MAT0_BL2, BANK1_MAT0_BLB2) via the switch pairs (SW20, SW21) and (SW30, SW31). The switch pairs (SW00, SW01) and (SW20, SW21) are controlled by the bank selecting signal BANK_SEL0, and the switch pairs (SW10, SW11) and (SW30, SW31) are controlled by the bank selecting signal BANK_SEL1. The sense amplifier 121_1 is connected to the bit line pair (BANK1_MAT0_BL4, BANK1_MAT0_BLB4) and (BANK0_MAT0_BL4, BANK0_MAT0_BLB4) via the switch pair (SW00', SW01') and (SW10', SW11'); and the sense amplifier 121_2 is connected to the bit line pair (BANK1_MAT0_BL6, BANK1_MAT0_BLB6) and (BANK0_MAT0_BL6, BANK0_MAT0_BLB6) via the switch pair (SW20', SW21') and (SW30', SW31'). The switch pairs (SW00', SW01') and (SW20', SW21') are controlled by the bank selecting signal BANK_SEL1, and the switch pairs (SW10', SW11') and (SW30', SW31') are controlled by the bank selecting signal BANK_SEL1.

Figure 4B:
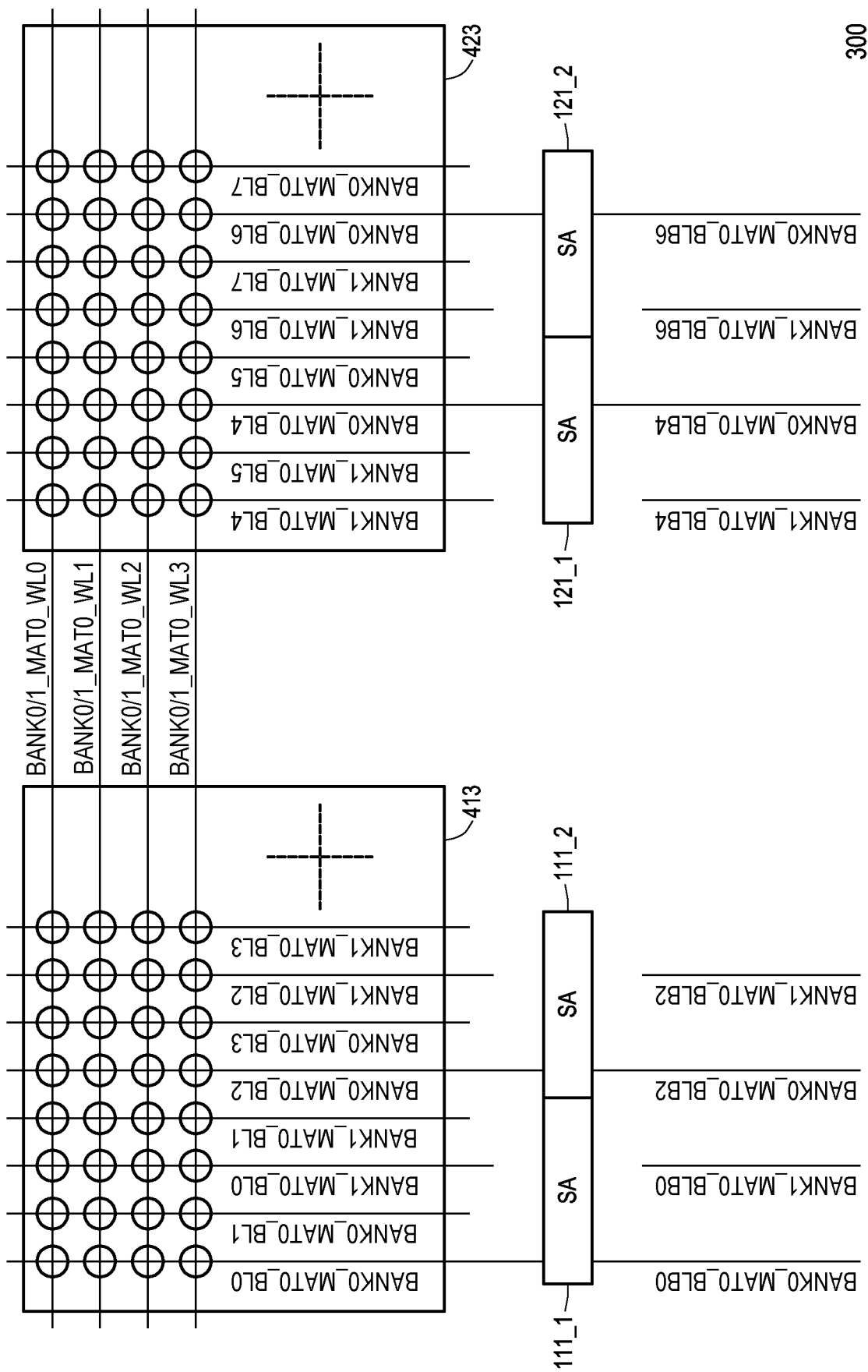

In operations of the DRAM device 300, when the selecting signal BANK_SEL0 is asserted to the physical memory areas 413 and 423 of the memory bank, the switch pairs (SW00, SW01), (SW20, SW21), (SW10', SW11'), (SW30', SW31') are switched on and the switch pairs (SW10, SW1), (SW30, SW31), (SW00', SW01'), (SW20', SW21') are switched off. FIG. 4B shows the DRAM device 300 when the selecting signal BANK_SEL0 is asserted to the physical memory areas 413 and 423 of the memory bank of the DRAM device 300. As shown in FIG. 4B, the sense amplifiers 111_1 and 111_2 are electrically connected to the bit line pair (BANK0_MAT0_BL0, BANK0_MAT0_BLB0) and the bit line pair (BANK0_MAT0_BL2, BANK0_MAT0_BLB2), respectively. Meanwhile, the sense amplifiers 121_1 and 121_2 are electrically connected to the bit line pair (BANK0_MAT0_BL4, BANK0_MAT0_BLB4) and the bit line pair (BANK0_MAT0_BL6, BANK0_MAT0_BLB6) respectively. The sense amplifiers 111_1, 111_2, 121_1 and 121_2 may perform the memory operation on selected memory cells connected to the bit line pairs (BANK0_MAT0_BL0, BANK0_MAT0_BLB0), (BANK0_MAT0_BL2, BANK0_MAT0_BLB2), (BANK0_MAT0_BL4, BANK0_MAT0_BLB4) and (BANK0_MAT0_BL6, BANK0_MAT0_BLB6) within one row cycle time period (tRC). In other words, the DRAM device 300 may perform the memory operation (or the ACTIVE-RD/WT-PRECHARGE operation) on all selected memory cells of the memory bank within one single row cycle time period (tRC).

Figure 4C:
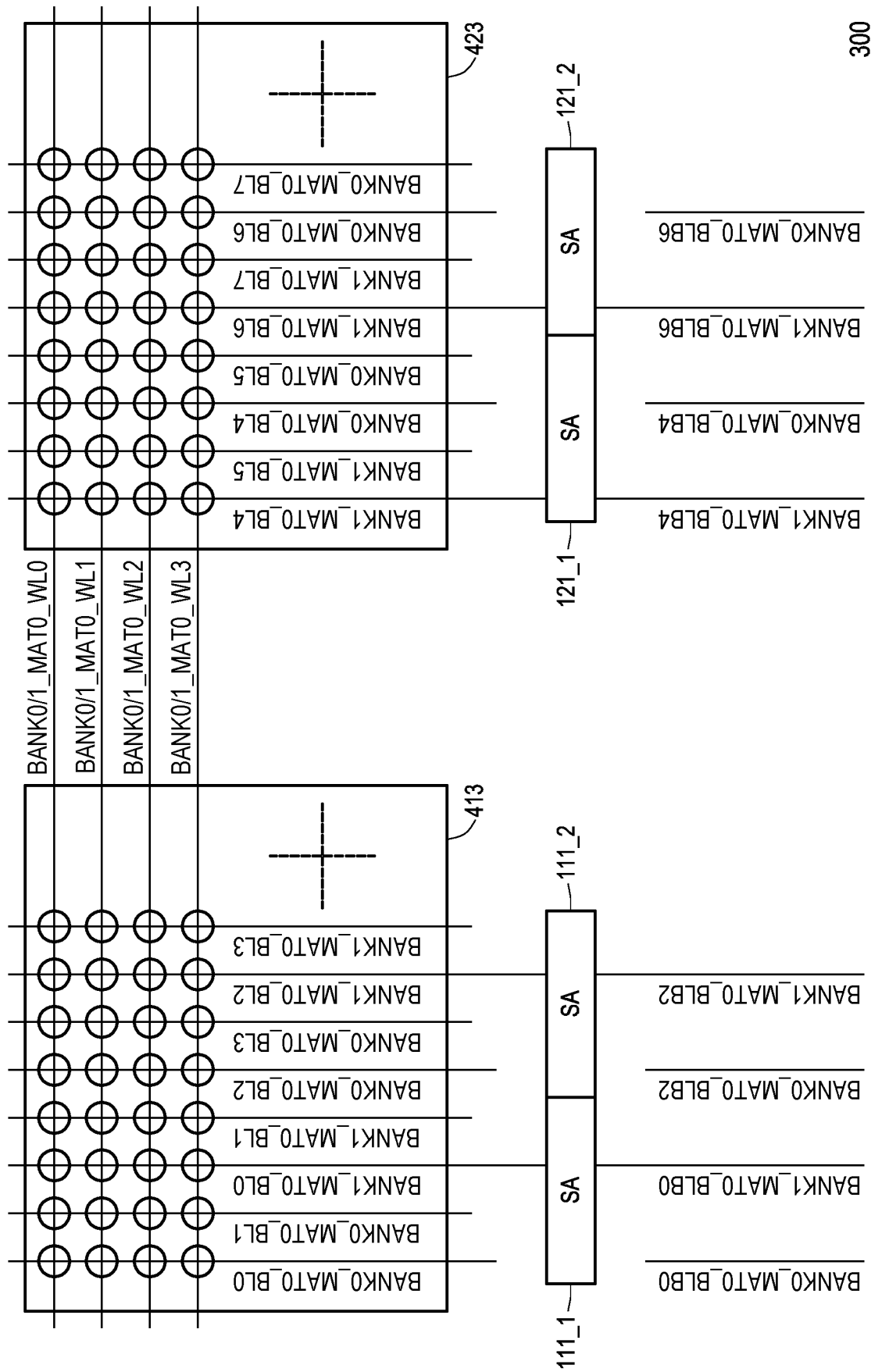

When the selecting signal BANK_SEL1 is asserted to the physical memory areas 413 and 423 of the memory bank, the switch pairs switch pairs (SW10, SW1), (SW30, SW31), (SW00', SW01'), (SW20', SW21') are switched on and the switch pairs (SW00, SW01), (SW20, SW21), (SW10', SW11'), (SW30', SW31') are switched off. FIG. 4C shows the DRAM device 300 when the selecting signal BANK_SEL1 is asserted to the physical memory areas 413 and 423 of the memory bank of the DRAM device 300. As shown in FIG. 4C, the sense amplifiers 111_1 and 111_2 are electrically connected to the bit line pair (BANK1_MAT0_BL0, BANK1_MAT0_BLB0) and the bit line pair (BANK1_MAT0_BL2, BANK1_MAT0_BLB2). Meanwhile, the sense amplifiers 121_1 and 121_2 are electrically connected to the bit line pair (BANK1_MAT0_BL4, BANK1_MAT0_BLB4) and the bit line pair (BANK1_MAT0_BL6, BANK1_MAT0_BLB6). The sense amplifiers 111_1, 111_2, 121_1 and 121_2 may perform the memory operation on selected memory cells connected to the bit line pairs (BANK1_MAT0_BL0, BANK1_MAT0_BLB0), (BANK1_MAT0_BL2, BANK1_MAT0_BLB2), (BANK1_MAT0_BL4, BANK1_MAT0_BLB4) and (BANK1_MAT0_BL6, BANK1_MAT0_BLB6) within one row cycle time period (RC). In other words, the DRAM device 300 may perform the memory operation (or the ACTIVE-RD/WT-PRECHARGE operation) on all selected memory cells of the memory bank within one single row cycle time period (tRC).

When the memory banks of the DRAM device are grouped according to the bank group concept, the DRAM device may perform the ACTIVE-RD/WT-PRECHARGE operation on all the selected memory cells of a memory bank in one row cycle time period. In this way, the number of the sense amplifiers in the DRAM device may be reduced, while the performance of the DRAM device in terms of processing time is not degraded.

Figure 5:
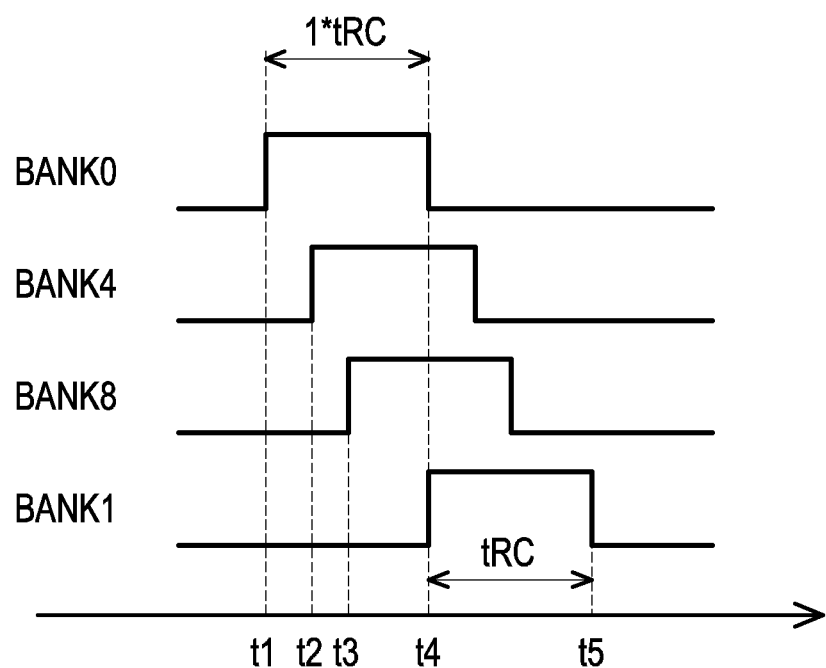
FIG. 5 is a timing diagram of accessing memory banks in a DRAM device in accordance with some embodiments.

FIG. 5 illustrates a timing diagram of accessing memory banks of different bank groups in a DRAM device in accordance with some embodiments. Referring to FIG. 3 and FIG. 5, the DRAM device may include bank groups 301 to 304, in which the memory banks BANK0 to BANK3 are grouped to the bank group 301, memory banks BANK4 to BANK7 are grouped to the bank group 302, memory banks BANK8 to BANK11 are grouped to the bank group 303, and memory banks BANK12 to BANK15 are grouped to the bank group 304. When the memory banks of the DRAM device are grouped to different bank groups according to the bank group concept, the memory banks of the same bank group can be accessed after one row cycle time period (tRC). For example, the memory bank BANK0 may be accessed at t1, and the memory bank BANK1, which is in the same group 301 as the memory bank BANK0, may be accessed at t4, in which a time interval between t1 and t4 is equal to one row cycle time period (tRC). The memory bank BANK1 may be accessed during the one row cycle time period from t4 to t5. Furthermore, when the memory banks of the DRAM device are grouped according to the bank group concept, the memory banks of the different bank group can be accessed directly after a certain delay. In other words, the memory banks of the different bank group do not need to wait for one row cycle time period (tRC) to start activating. For example, the BANK4 of the bank group 302 may be accessed at t2 after the certain delay from t1, and the bank BANK8 of the bank group 303 may be accessed at t3 after the certain delay from t2. In this way, the DRAM device with reduced number of sense amplifiers can be accessed efficiently.

Figure 6:
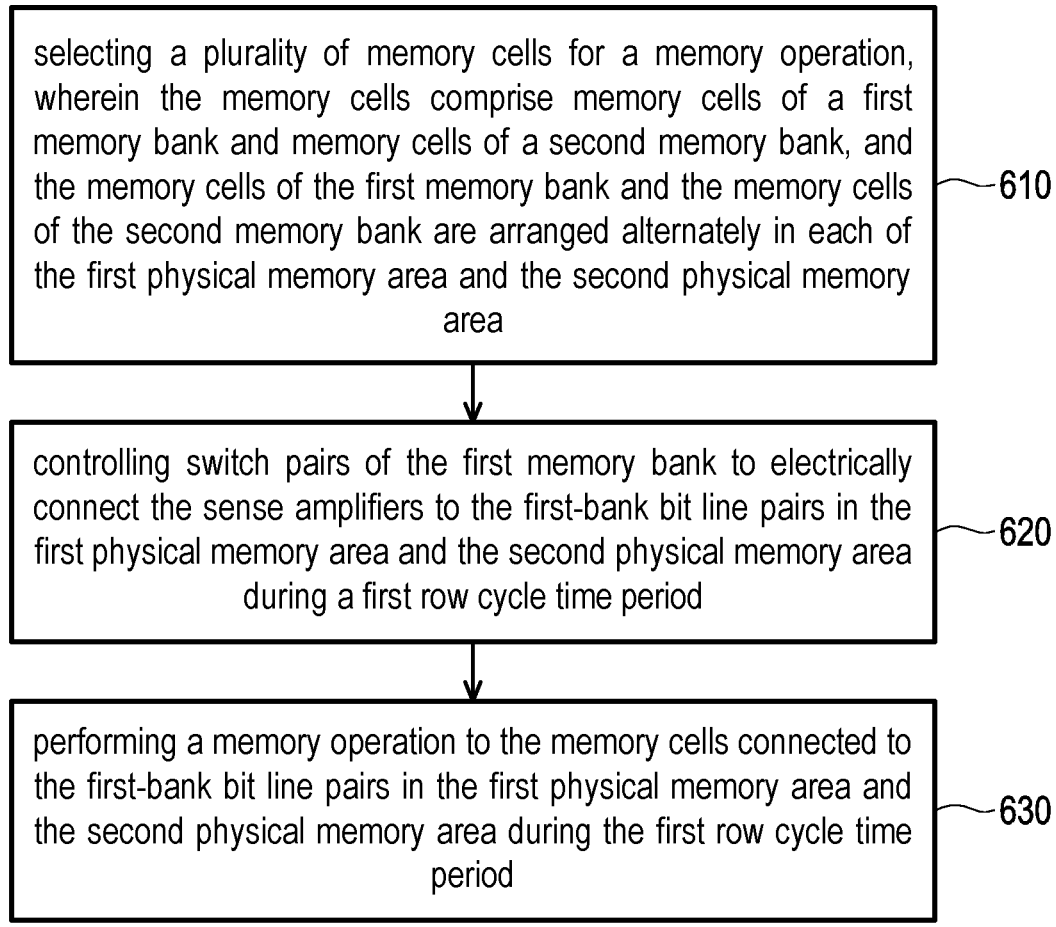
FIG. 6 is a flowchart diagram of a method adapted to a DRAM device in accordance with some embodiments.

FIG. 6 illustrates a flowchart diagram of a method adapted to a DRAM device in accordance with some embodiments. The DRAM device includes a first physical memory area corresponding to a first memory mat, and a second physical memory area corresponding to a second memory mat, a plurality of sense amplifiers, a plurality of bit line pairs and a plurality of switch pairs. In block 610, a plurality of memory cells for a memory operation is selected. The memory cells may comprise memory cells of a first memory bank and memory cells of a second memory bank, and the memory cells of the first memory bank and the memory cells of the second memory bank are arranged alternately in each of the first physical memory area and the second physical memory area. In block 620, switch pairs of the first memory bank are controlled to electrically connect sense amplifiers to the first-bank bit line pairs in the first physical memory area and the second physical memory area during a first row cycle time period. In block 630, a memory operation is performed to the memory cells connected to the first-bank bit line pairs in the first physical memory area and the second physical memory area during the first row cycle time period.

In accordance with the above embodiments, the bit line pairs are connected to sense amplifiers of a DRAM device using switch pairs. If each sense amplifier is connected to two bit line pairs via switch pairs, a number of sense amplifiers in the DRAM device is reduced by a half. Each sense amplifier may be connected to more than two bit line pairs via switch pairs to further reduce the number of sense amplifiers in the DRAM device. In this way, the number of the sense amplifiers in the DRAM device is reduced, and the occupied area of the DRAM device on a wafer die is reduced. Furthermore, the memory banks of the DRAM device can be grouped to bank groups according to a bank group concept, and the DRAM device may perform the memory operation in conjunction with the bank group concept. In the bank group concept, a same physical memory area may include memory cells of different banks, and the rows of the memory cells in the physical memory area are connected to shared word lines. In this way, the DRAM device with reduced number of sense amplifiers may perform the memory operation (i.e., ACTIVE-RD/WT-PRE-CHARGE operation) in one row cycle time period.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A dynamic random-access memory (DRAM) device, comprising:
   a first physical memory area corresponding to a first memory mat;
   a second physical memory area corresponding to a second memory mat, wherein each of the first physical memory area and the second physical memory area comprises a plurality of memory cells, the plurality of memory cells comprise memory cells of a first memory bank and memory cells of a second memory bank, and the memory cells of the first memory bank and the memory cells of the second memory bank are arranged alternately in each of the first physical memory area and the second physical memory area;
   a plurality of bit line pairs, comprising first-bank bit line pairs and second-bank bit line pairs, the first-bank bit line pairs are connected to the memory cells of the first memory bank in the first physical memory area and the second physical memory area, and the second-bank bit line pairs are connected to the memory cells of the second memory bank in the first physical memory area and the second physical memory area;
   a plurality of switch pairs, connected to the bit line pairs;
   a plurality of sense amplifiers, connected to the bit line pairs via the switch pairs, each sense amplifier being connected to at least two bit line pairs via at least two switch pairs,
   wherein the switch pairs are configured to electrically connect the sense amplifiers to the first-bank bit line pairs connected to the memory cells of the first memory bank in the first physical memory area and the first-bank bit line pairs connected to the memory cells of the first memory bank in the second physical memory area during a first row cycle time period, and
   the sense amplifiers are configured to perform a memory operation to the memory cells connected to the first-bank bit line pairs in the first physical memory area and the second physical memory area during the first row cycle time period.

2. The DRAM device of claim 1, further comprising:
   a plurality of shared word lines, wherein the shared word lines are shared between the first physical memory area and the second physical memory area,
   wherein each of the shared word lines is configured to select a row of memory cells in the first physical memory area and a row of memory cells in the second physical memory area for the memory operation.

3. The DRAM device of claim 1, wherein
the first-bank bit line pairs and the second-bank bit line pairs in each of the first physical memory area and the second physical memory area are arranged alternately.

4. The DRAM device of claim 1, wherein
wherein a number of the sense amplifiers is less than a number of bit line pairs.

5. The DRAM device of claim 1, wherein
the switch pairs comprises first-bank switch pairs and second-bank switch pairs,
the first-bank switch pairs are connected to the first-bank bit line pairs,
the second-bank switch pairs are connected to the second-bank bit line pairs,
the first-bank switch pairs are controlled by a first bank selecting signal, and
the second-bank switch pairs are controlled by a second bank selecting signal.

6. The DRAM device of claim 5, wherein
the first bank selecting signal is asserted to the first-bank switch pairs during the first row cycle time period.

7. The DRAM device of claim 5, wherein
the second bank selecting signal is asserted to the second-bank switch pairs during a second row cycle time period.

8. The DRAM device of claim 7, wherein
the switch pairs are configured to electrically connect the sense amplifiers to the second-bank bit line pairs in the first physical memory area and the second physical memory area during the second row cycle time period, and
the sense amplifiers are configured to perform the memory operation to the memory cells connected to the second-bank bit line pairs in the first physical memory area and the second physical memory area during the second row cycle time period.

9. The DRAM device of claim 8, wherein
the second row cycle time period starts after the first row cycle time period elapses.

10. A dynamic random-access memory (DRAM) device, comprising:
a plurality of memory cells, comprising first selected memory cells and second selected memory cells for a memory operation;
a plurality of bit line pairs, comprising first-bank bit line pairs and second-bank bit line pairs, wherein the first-bank bit line pairs are connected to the first selected memory cells, and the second-bank bit line pairs are connected to the second selected memory cells;
a plurality of switch pairs, comprising first-bank switch pairs and second-bank switch pairs, wherein the first-bank switch pairs are connected to the first-bank bit line pairs and the second-bank switch pairs are connected to the second-bank bit line pairs; and
a plurality of sense amplifiers, connected to the bit line pairs via the switch pairs, each sense amplifier being connected to at least two bit line pairs via at least two switch pairs,
wherein the first-bank switch pairs are configured to electrically connect the sense amplifiers to the first-bank bit line pairs connected to the first selected memory cells of the first memory bank in a first physical memory area and the first-bank bit line pairs connected to the first selected memory cells of the first memory bank in a second physical memory area during a first row cycle time period, and the sense amplifiers are configured to perform the memory operation on the first selected memory cells connected to the first-bank bit line pairs during the first row cycle time period, and
the second-bank switch pairs are configured to electrically connect the sense amplifiers to the second-bank bit line pairs connected to the memory cells of the second memory bank in the first physical memory area and the second-bank bit line pairs connected to the memory cells of the second memory bank in the second physical memory area during a second row cycle time period, and the sense amplifiers are configured to perform the memory operation on the second selected memory cells connected to the second-bank bit line pairs during the second row cycle time period.

11. The DRAM device of claim 10, wherein
The first-bank bit line pairs and the second-bank bit line pairs in each of the first physical memory area and the second physical memory area are arranged alternately.

12. The method of claim 10, wherein a number of the sense amplifiers is less than a number of bit line pairs.

13. The method of claim 10, wherein
the first-bank switch pairs are controlled by a first bank selecting signal,
the second-bank switch pairs are controlled by a second bank selecting signal, and
the second bank selecting signal is asserted to the second-bank switch pairs after the first bank selecting signal is asserted to the first-bank switch pairs.

14. A method of a dynamic random-access memory (DRAM) device comprising a first physical memory area corresponding to a first memory mat, and a second physical memory area corresponding to a second memory mat, a plurality of sense amplifiers, a plurality of bit line pairs and a plurality of switch pairs, the method comprising:
selecting a plurality of memory cells for a memory operation, wherein the plurality of memory cells comprise memory cells of a first memory bank and memory cells of a second memory bank, and the memory cells of the first memory bank and the memory cells of the second memory bank are arranged alternately in each of the first physical memory area and the second physical memory area;
controlling switch pairs of the first memory bank to electrically connect the sense amplifiers to the first-bank bit line pairs connected to the memory cells of the first memory bank in the first physical memory area and the first-bank bit line pairs connected to the memory cells of the first memory bank in the second physical memory area during a first row cycle time period; and
performing a memory operation to the memory cells connected to the first-bank bit line pairs in the first physical memory area and the second physical memory area during the first row cycle time period.

15. The method of claim 14, wherein the DRAM further comprises:
a plurality of shared word lines, wherein the shared word lines are shared between the first physical memory area and the second physical memory area,
wherein each of the shared word lines is configured to select a row of memory cells in the first physical memory area and a row of memory cells in the second physical memory area for the memory operation.

16. The method of claim 14, wherein
the first-bank bit line pairs and the second-bank bit line pairs in each of the first physical memory area and the second physical memory area are arranged alternately.

17. The method of claim 14, wherein
a number of the sense amplifiers is less than a number of bit line pairs.

18. The method of claim 14, wherein
the switch pairs comprises first-bank switch pairs and second-bank switch pairs,
the first-bank switch pairs are connected to the first-bank bit line pairs,
the second-bank switch pairs are connected to the second-bank bit line pairs,
the first-bank switch pairs are controlled by a first bank selecting signal, and
the second-bank switch pairs are controlled by a second bank selecting signal.

19. The method of claim 18, wherein
the first bank selecting signal is asserted to the first-bank switch pairs during the first row cycle time period.

20. The method of claim 18, further comprising:
asserting the second bank selecting signal to the second-bank switch pairs during a second row cycle time period;
electrically connecting the sense amplifiers to the second-bank bit line pairs in the first physical memory area and the second physical memory area during the second row cycle time period; and
performing the memory operation to the memory cells connected to the second-bank bit line pairs in the first physical memory area and the second physical memory area during the second row cycle time period.

* * * * *